US010599016B2

(12) United States Patent
Overall

(10) Patent No.: US 10,599,016 B2
(45) Date of Patent: Mar. 24, 2020

(54) CAMERA FILTER IDENTIFICATION SYSTEM

(71) Applicant: Jeffrey Paul Overall, Fountain Valley, CA (US)

(72) Inventor: Jeffrey Paul Overall, Fountain Valley, CA (US)

( * ) Notice: Subject to any disclaimer, the term of this patent is extended or adjusted under 35 U.S.C. 154(b) by 142 days.

(21) Appl. No.: 15/716,863

(22) Filed: Sep. 27, 2017

(65) Prior Publication Data

US 2019/0094661 A1 Mar. 28, 2019

(51) Int. Cl.
| | |
|---|---|
| G03B 17/14 | (2006.01) |
| G02B 5/30 | (2006.01) |
| G02B 5/20 | (2006.01) |
| G03B 17/56 | (2006.01) |
| G03B 11/00 | (2006.01) |
| G02B 6/12 | (2006.01) |

(52) U.S. Cl.
CPC ............. *G03B 17/14* (2013.01); *G02B 5/20* (2013.01); *G02B 5/205* (2013.01); *G02B 5/30* (2013.01); *G03B 11/00* (2013.01); *G03B 17/565* (2013.01); *G02B 2006/12109* (2013.01); *H04N 2201/02493* (2013.01)

(58) Field of Classification Search
CPC .......... G02B 7/006; G02B 2006/12109; G02B 5/20; G02B 5/205; G02B 5/30; G03B 11/00; G03B 17/565; G03B 17/568; G03B 17/12; G03B 17/14; H04N 2201/02493
USPC ........................................................ 348/360
See application file for complete search history.

(56) References Cited

U.S. PATENT DOCUMENTS

| | | | |
|---|---|---|---|
| 4,936,170 A | 6/1990 | Zumeta | |
| 4,982,627 A * | 1/1991 | Johnson | B23B 31/005 81/121.1 |
| 5,031,488 A * | 7/1991 | Zumeta | B25B 13/06 116/335 |
| 5,498,158 A | 3/1996 | Wong | |
| 6,257,098 B1 * | 7/2001 | Cirone | B25B 13/56 81/119 |
| 6,792,831 B2 | 9/2004 | Crossner | |
| 6,807,736 B2 | 10/2004 | Langley | |
| 7,895,724 B1 | 3/2011 | Dugan | |
| 8,619,182 B2 | 12/2013 | Fainstain | |
| 2018/0068396 A1 * | 3/2018 | Lyons | A01M 7/0046 |

OTHER PUBLICATIONS

Zhang, Michael; "OWL is the World's First Drop-In Filter Adapter That Lets You Swap Filters in a Flash"; Feb. 18, 2015; Petapixel website; <https://petapixel.com/2015/02/18/owl-is-the-worlds-first-drop-in-filter-adapter-that-lets-you-swap-filters-in-a-flash /> (Year: 2015).*
Emolux; "Emolux DTF Colored Frame UV Lens Protector for DSLR lenses"; Sep. 24, 2010; Photokina website; <http://neuheiten.koelnmesse.net/240/2010/us/products/view/product_id:483/cat:25> (Year: 2010).*

* cited by examiner

*Primary Examiner* — John Villecco

(57) ABSTRACT

A method of color coding for instant identification of camera filters. The outside of frames of filters are covered in a distinct color, simplifying identification between camera filters. Color coding replaces or augments the method of written specifications on camera filter frames. Higher quality photography and videography is facilitated by providing the operator with more time to evaluate scenery and adjust camera settings.

4 Claims, 3 Drawing Sheets

| Filter Color Chart: Neutral Density and Polarizing Filters | |
|---|---|
| Frame Color | Filter Specifications |
| ◯ | Neutral Density 64 |
| ◯ | Neutral Density 32 |
| ◯ | Neutral Density 16 |
| ◯ | Neutral Density 8 |
| ◯ | Neutral Density 4 |
| ◯ | Neutral Density 8/Polarizer |
| ◯ | Polarizer |

| Filter Color Chart: Neutral Density and Polarizing Filters | |
|---|---|
| Frame Color | Filter Specifications |
| ⌀ | Neutral Density 64 |
| ⌀ | Neutral Density 32 |
| ⌀ | Neutral Density 16 |
| ⌀ | Neutral Density 8 |
| ⌀ | Neutral Density 4 |
| ⌀ | Neutral Density 8/Polarizer |
| ⌀ | Polarizer |

CAMERA FILTER IDENTIFICATION SYSTEM

FIELD OF INVENTION

This invention relates generally to camera filters. Specifically, it relates to identifying camera filters of different image altering capacities and qualities. The invention uses coding to enable distinction of camera filters with similar appearances but different image modifying abilities and material quality.

LIST OF PRIOR ART

U.S. Patents

| Pat. No.: | Kind Code: | Grant Date: | Patentee: |
|---|---|---|---|
| 4,936,170 | A | 1990 Jun. 26 | Zumeta |
| 5,498,158 | A | 1996 Mar. 12 | Wong |
| 6,792,831 | B2 | 2004 Sep. 21 | Crossner |
| 6,807,736 | B2 | 2004 Oct. 26 | Langley |
| 7,895,724 | B1 | 2011 Mar. 1 | Dugan |
| 8,619,182 | B2 | 2013 Dec. 31 | Fainstain |

BACKGROUND/PRIOR ART

Camera filters are used to alter and improve the quality of photography and video footage. Placed over the lens, camera filters improve image quality by modifying light penetration. Different classes of filters provide different functions. Environment and desired image appearance determine the appropriate filter. Neutral density filters, for example, are used for image saturation by attenuating light. There is a wide range of neutral density filters exist, providing different levels of image saturation. A polarized filter eliminates unwanted reflections and creates a clearer image. UV filters can be used to protect a filter and improve image quality. Light corrective filters can be used to compensate for irregularities caused by water quality in underwater shooting. Warming and cooling filters also correct color balance or enhance contrast or diffusion, as desired.

The quality of filters within a class vary significantly. "Class" herein is used to refer to filters capable of similar light modifying function, and traditionally given the same designation by the photography and videography industry. The light modifying element of a filter can be made from glass, polyester, gelatin or resin; all producing different quality images. Glass quality can also vary. "Light modifying element" will be used herein broadly to refer to the image altering, light transmissive component of the filter.

Choosing the right filter is vital to quality photography and videography. High quality photography requires two things above all else: capturing the right image and utilizing the right equipment to modify that image. Because of the fleeting nature of most shots or scenes, the identification and installation of the right filter on the camera must be made very quickly. Multiple steps must be taken to properly adjust the camera for the desired shot. Aperture must be adjusted for proper depth of field. Appropriate shutter speed is determined based on desired movement effect. These factors interact with each other and are also affected by filter choice. The filter must be installed on the lens by threading or pressure fitting. A photographer has many decisions to make in a limited amount of time.

Time is further constricted by obstacles in identifying the right camera filter. Filters with different functions often appear very similar in isolation. Filters configured for the same lens are required to be very similar, if not identical, in size. The light modifying element color of filters with different specifications appear similar. Neutral density filters and polarizer filters, for example, use light modifying elements of similar grayish hues or black. The light modifying element of neutral density filters with different color saturation capacities can appear nearly indistinguishable in isolation. Color corrective filter light modifying elements can also appear similar in filters intended for different settings. Difficulties caused by the similarity in light modifying element appearance is exacerbated when ambient lighting isn't ideal or the photographer is far sighted. Determining filter quality by looking at the light modifying element requires close scrutiny and manipulation of the filter.

Currently, filter specifications are indicated on the side of the filter frame in writing. This writing is necessarily miniscule because of the thinness of frames. Inspection required by the small writing is inconvenient and time consuming when a photographer is rushing to capture a transitory image opportunity. Filters must be rotated or flipped to read the specifications. The size of the writing makes reading difficult under the best conditions. Operating underwater or in nature can make this evaluation impossible, and cause a user to drop and damage, or lose the filter. The specification writing can be covered by dirt or removed by damage. These restrictions in identifying the filter prevent a photographer from quickly choosing the necessary filter, and in turn can result in the desired shot or scene vanishing before it is captured.

Advances in technology are allowing for increasingly smaller camera lens sizes. Lens housings with diameters of 1 cm$^2$ or smaller are now capable of recording high quality images. Filters configured for these lenses can be 1 mm or smaller in thickness. These sizes prohibit written specifications that are legible to the naked eye. Identification must be achieved by an alternative method.

Organization can also be difficult when filters are only distinguished by writing on the outer frame of the filter. The user must take the time to read the individual specifications to organize the filters in meaningful order.

ADVANTAGES

The current system significantly reduces the time and effort needed to identify the correct filter. Color coding is used as the indicia of camera filter function and quality. The outside of filter frame is a solid color or pattern to allow easy identification. The photographer does not have to read the tiny writing to discern respective filter type. The color can be seen from all angles, so the lens does not have to be manipulated to read the specifications. Filters that would otherwise have very similar appearances are clearly distinguished by making the frames distinct colors. Selection of the necessary filter is simplified by making the colors correspond to the lens quality or function. Elimination of the entire color by damage or dirt is unlikely, alleviating the problem posed by damage or dirtying written specs. Smaller filters not permitting written specs can be identified by their distinct colors.

Organization is simplified. A photographer can quickly organize and identify her filters. Filters can be quickly arranged based on their respective function and quality. Good photography and videography requires precision and speed in choosing equipment. This invention improves the process by reducing the effort and time needed to identify the correct filter. A photographer utilizing the invention has more time to evaluate his subject and calibrate the camera settings.

SUMMARY

Disclosed is a system of differentiating camera filters by color coding the frame. The outer frames of filters are given distinguishing colors. The application of color can be by anodization, electrolytic oxidation, or other process. The inside surface of the frame is black, to permit the necessary light absorption.

In the exemplary embodiment filters are differentiated by class, and within class, by the individual filter's relative propensity to perform the class's image modifying function. Each filter class will be assigned a distinct base color. "Base color" is used herein to refer to the a unique color; it is not meant in refer to primary or other color designations. The neutral density filters class will have a different base color than a polarizer filter, for example. Within the class of neutral density filters each individual filter frame will be assigned a tint or shade of the class's color range. "Color range" is used herein to refer to a subset of colors or a range of tints or shades derived from a base color. In the exemplary embodiment, a filter with greater ability to saturate or darken an image will be assigned a relatively darker frame color shade. The difference in frame tint or shade is great enough to distinguish the filters. Further, in the exemplary embodiment filters with both neutral density and polarization capabilities would be assigned a color distinguishing the dual capacity from the filters with the singular capability.

Color coding can also be used to distinguish different quality filters in the same class. For example, neutral density filters with light modifying elements comprised of different materials are assigned different base colors. These colors can be random or associative, e.g. golds for higher quality, silvers or grays for lower quality.

The exemplary embodiment includes a mnemonic chart listing the different filters' specifications and their respective frame colors. The chart or spreadsheet will allow a new user to become familiar with the coding system. Assignment of colors in the exemplary embodiment is intuitive; not much time will be required for an active user to learn the system.

The primary objective of the present invention is to allow a photographer to quickly select the appropriate camera filter. The secondary objective is to allow the user to distinguish between different quality camera filters.

Additional embodiments can use a color coding scheme that assigns a distinct base colors or patterns to filters within the same class. While not providing the intuitive advantages above, this would still simplify the identification of filters.

Additional embodiments can assign the distinct base color or pattern to all the filters in the class. This will allow the user to distinguish the between different classes of filters.

Additional embodiments can assign distinct base colors or patterns to filters within the same class having different quality light modifying element. This will permit identification of filters in the same class, with the same specifications, but capable of taking different quality images.

DRAWING: LIST OF REFERENCE NUMERALS

Figure 1:
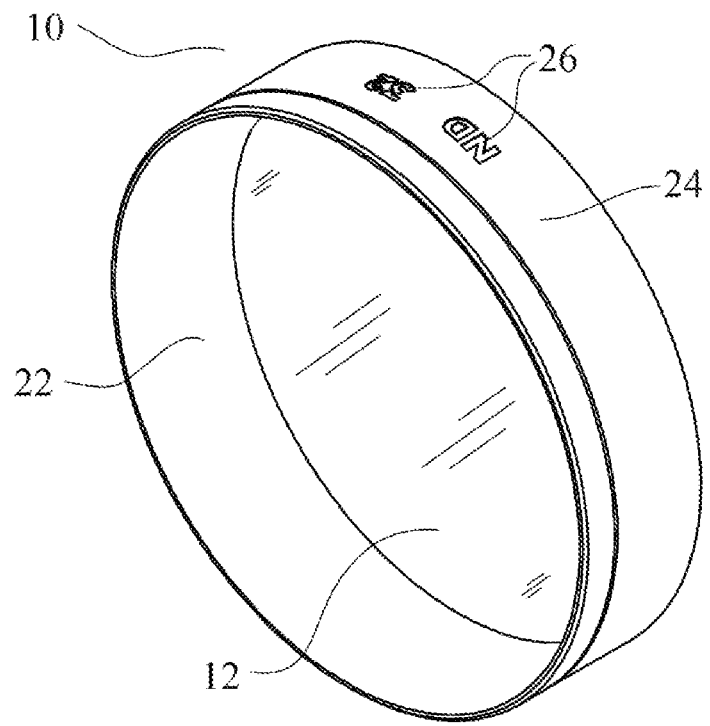
FIG. 1 shows a back perspective view of the back of a camera filter

10 filter
12 light modifying element
22 inside frame
24 frame
26 specifications
50 prior art set
52 coded set
60 Neutral Density 64 filter
62 Neutral Density 128 filter
64 Neutral Density 256 filter

DETAILED DESCRIPTION OF DRAWINGS

FIG. 1 depicts the prior art of specifications 26 written on the side of a filter frame 24. The exemplary filter 10 has a cylindrical shape. Camera filters are both cylindrical and cubic. The inside of the frame 22 is black in all embodiments to permit necessary light absorption. The filter specifications 26 can be seen at the top of the frame 24. The exemplary filter 10 is a neutral density 32. Light modifying element 12 with neutral density 32 capacity is conjoined with the distal part of the inside of the frame 22.

Figure 2:
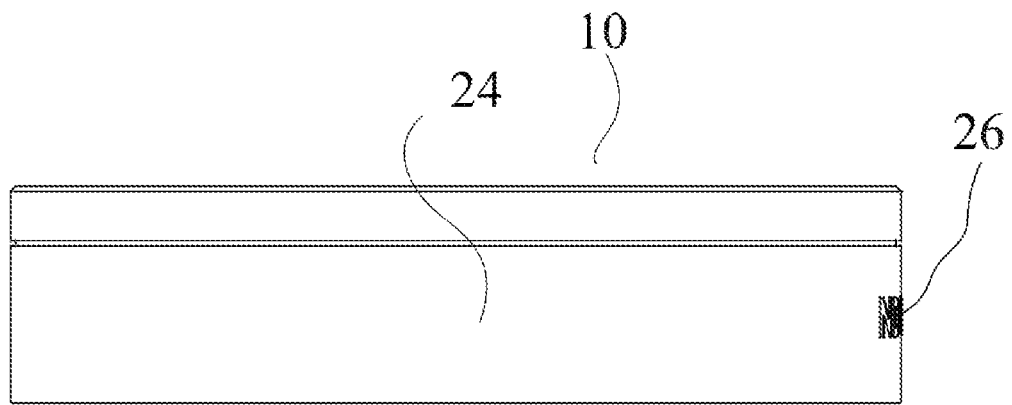
FIG. 2 shows a horizontal side view of an exemplary camera filter

While it is easy to view the specifications 26 from the vantage point provided in FIG. 1, it becomes more difficult when viewed from other vantage points. FIG. 2 depicts a horizontal sideview of the frame 24. The filter 10 orientation prevents reading of the entire specification 26 without manipulation. The frame 24 can be seen clearly from this and most other vantage points.

Figures 3A, 3B:
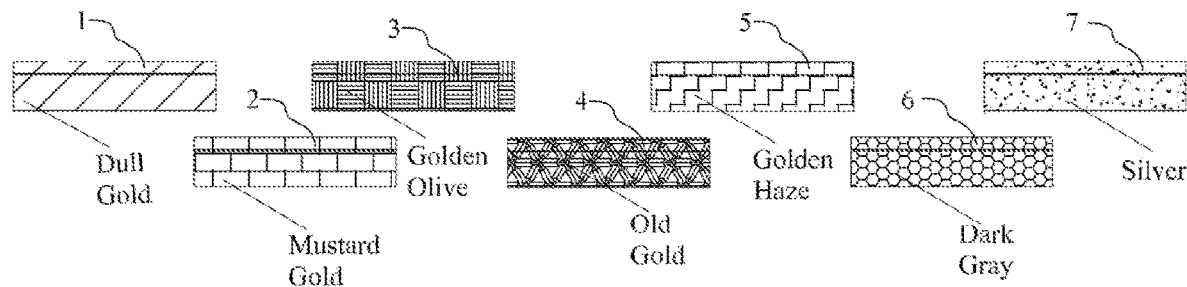
FIG. 3A shows an assortment of filters with distinguishing colors
FIG. 3B shows a mnemonic chart clarifying filter color assignment.

FIG. 3A-3B are schematic drawings demonstrating an exemplary coding system. Side views of seven identically sized filters are provided in FIG. 3A. Filters 1-5 are neutral density class filters with decreasing ability to saturate an image. Filter 7 is a polarizer with the ability to reduce glare. Filter 6 is a filter with both neutral density and polarizing capacity. The neutral density filters 1-5 are assigned distinguishing tints or hues in the gold range. But for the unique colors, the filters would be indistinguishable. Patterns are used to portray the colors. Captions below each filter indicate the color the pattern represents.

FIG. 3B is an exemplary mnemonic chart provided to facilitate memorization of the color scheme. The filter specifications and corresponding frame color are provided. In this embodiment, a gold color scheme is used to indicate neutral density filters. Silver is used to indicate a polarizing filter. Dark gray is used to distinguish a filter with both polarization and neutral density capabilities. A chart or spreadsheet of this nature can aid in memorization of the system. The mnemonic chart can be separate or affixed to an accompanying filter case (bag, backpack, etc.).

Figure 4:
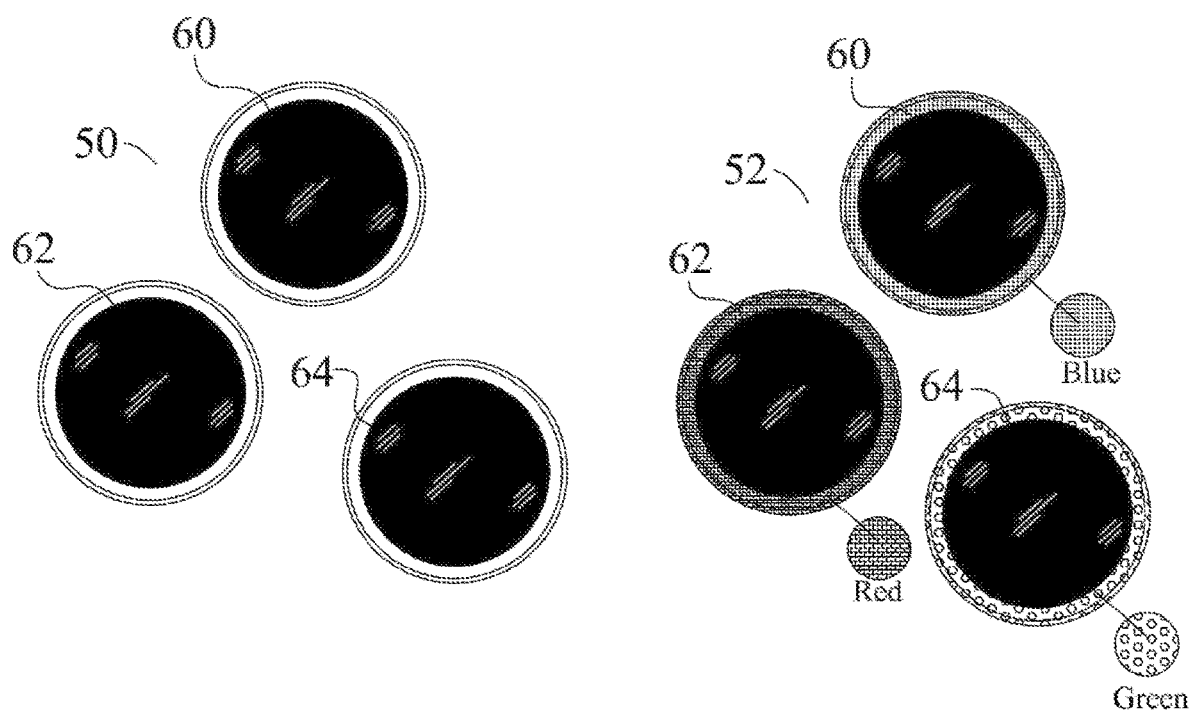
FIG. 4 shows a top view comparison of the prior art and an embodiment of the current invention

FIG. 4 depicts another embodiment of the invention 52 in comparison with the prior art 50. There are two sets of three filters laying horizontal and viewed from above. This is the vantage point from which a photographer will typically view unattached camera filters. The lenses in each set are Neutral Density 64 60, Neutral Density 128 62, and Neutral Density 256 64 filters. The light modifying element for these filters are black in appearance, as represented in the figure. The prior art set 50 includes filters with the same color frames. Written specs are not often included on the front of the filter frame, making it difficult to distinguish between similarly sized filters in the same class. Some filter configurations result in too little space to write specifications on the front of the frame.

The coded set 52 utilizes an embodiment of the frame coding method. Filters can be easily distinguished based on color. The user does not have to manipulate the filter to read the specification on the side. Identification of the appropriate filter can be made by the distinct color while the photographer continues to hold the camera with both hands. In this embodiment the filters are in the same class and assigned distinct base colors green, red, and blue.

The foregoing discussion discloses and describes merely exemplary methods and embodiments. As will be understood by those familiar with the art, the disclosed subject matter may be embodied in other specific forms without departing from the essence or characteristics thereof. Accordingly, the foregoing disclosure is intended to be illustrative, but not limiting, of the scope of the invention, which is set forth in the following claims.

I claim:

1. A camera filter set, comprising:
   a plurality of camera filters;
   each of said plurality of camera filters comprising a light transmissive element and a frame;
   a plurality of base colors;
   a plurality of second colors corresponding to each of said plurality of base colors comprising shades or tints of each of said plurality of base colors;
   a plurality of classes within said plurality of camera filters, said classes corresponding to light modifying specifications of the light transmissive element;
   said frames of each of said plurality of camera filters comprising an inside and an outside;
   at least one of said plurality of base colors being assigned to each class of said plurality of classes; one of said plurality of second colors, based on the light modifying specifications of the light transmissive element, being assigned to each of said plurality of filters within a class of said plurality of classes, wherein each of said plurality of filters within the class of said plurality of classes is assigned a different said shade or tint, and wherein a darker said shade or tint is assigned to a filter within the class with a greater ability to saturate or darken an image;
   the outside of said frames comprising the assigned second color, whereby said plurality of camera filters may be visually distinguished;
   the inside of said frames comprising a black surface.

2. The camera filter set of claim 1, further comprising a mnemonic chart for identifying all of the colors, shades, and tints and their association with the light modifying specifications of the plurality of camera filters.

3. A set of neutral density and polarizer camera filters, comprising:
   a plurality of camera filters, each of said plurality of camera filters comprising a light transmissive element and a frame;
   each of said frames comprising an inside and an outside;
   a first set of said plurality of camera filters comprising a neutral density filter class, said neutral density filter class comprising said light transmissive elements with neutral density image modifying specifications;
   a second set of said plurality of camera filters comprising a polarizer filter class, said polarizer filter class comprising said light transmissive elements with polarization image modifying specifications;
   a first base color assigned to the neutral density filter class;
   a second base color assigned to the polarizer filter class;
   a third class of camera filters comprising at least one filter of said plurality of camera filters comprising said light transmissive elements with both neutral density and polarizing image modifying specifications;
   a third based color assigned to filters in said third class;
   a plurality of first secondary colors comprising a shade or tint of the first base color assigned to each filter in the neutral density filter class with light transmissive elements of different image modifying specifications; wherein frames of each filter in the neutral density filter class are assigned said shade or tint of the plurality of first secondary colors, and wherein a darker said shade or tint is assigned to said filters within the class of neutral density filters with a greater ability to saturate or darken an image;
   a one or more second secondary color assigned to each filter with different light transmissive elements of different image modifying specifications with said third class of camera filters;
   said second base color, said plurality of first secondary base colors, and said one or more second secondary colors are permanently applied to the outside of said frames.

4. The set of neutral density and polarizer camera filters of claim 3, further comprising a mnemonic chart for identifying all of the colors, shades, and tints and their associations with the image modifying specifications of the plurality of camera filters.

* * * * *